United States Patent
Kobayashi

(10) Patent No.: US 10,876,501 B2
(45) Date of Patent: Dec. 29, 2020

(54) HYBRID VEHICLE

(71) Applicant: TOYOTA JIDOSHA KABUSHIKI KAISHA, Aichi-ken (JP)

(72) Inventor: Junya Kobayashi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/268,497

(22) Filed: Feb. 6, 2019

(65) Prior Publication Data

US 2019/0249628 A1    Aug. 15, 2019

(30) Foreign Application Priority Data

Feb. 13, 2018    (JP) ................ 2018-023277

(51) Int. Cl.
*F02M 26/33*    (2016.01)
*F02M 26/28*    (2016.01)
(Continued)

(52) U.S. Cl.
CPC ............. *F02M 26/33* (2016.02); *B60K 6/22* (2013.01); *B60W 20/00* (2013.01); *B60W 20/15* (2016.01); *F02B 29/0443* (2013.01); *F02B 29/0493* (2013.01); *F02D 41/0002* (2013.01); *F02D 41/042* (2013.01); *F02M 26/28* (2016.02); *F02M 31/00* (2013.01); *F02M 31/042* (2013.01); *F02M 31/10* (2013.01); *F02M 31/20* (2013.01); *F02N 11/0814* (2013.01); *B60W 2510/0676* (2013.01); *B60W 2510/08* (2013.01); *B60W 2520/10* (2013.01); *B60W 2555/20* (2020.02); *B60Y 2200/92* (2013.01); *B60Y 2306/05* (2013.01); *F02D 41/0065* (2013.01);
(Continued)

(58) Field of Classification Search
CPC ................ F02D 41/042; F02B 29/0443; F02B 29/0493; F02M 26/33; F02M 26/28; F02M 31/042; F02M 31/10; F02M 31/107; F02M 31/20; F02M 31/205
See application file for complete search history.

(56) References Cited

U.S. PATENT DOCUMENTS

2003/0127077 A1*  7/2003  Sisken ............... F02D 21/08
                                                      123/568.11
2013/0184975 A1   7/2013  Wu et al.
(Continued)

FOREIGN PATENT DOCUMENTS

EP    3130790 A1    2/2017
JP    2013-7338 A   1/2013
(Continued)

*Primary Examiner* — Sizo B Vilakazi
*Assistant Examiner* — Anthony L Bacon
(74) *Attorney, Agent, or Firm* — Hauptman Ham, LLP

(57) ABSTRACT

An engine includes an EGR device and a water-cooled heat exchanger. The water-cooled heat exchanger is provided on a downstream side of an EGR gas-introduction portion of an intake passage into which EGR gas is to be introduced and exchanges heat with gas flowing in the intake passage. A control device is programmed to execute condensed water-suppression control that supplies coolant having a temperature higher than the temperature of the gas heat-exchanged in the water-cooled heat exchanger to the water-cooled heat exchanger while a hybrid vehicle is traveling in a state in which the engine is stopped.

8 Claims, 11 Drawing Sheets

(51) Int. Cl.
  *F02M 31/04*   (2006.01)
  *F02D 41/04*   (2006.01)
  *F02M 31/00*   (2006.01)
  *F02M 31/10*   (2006.01)
  *F02M 31/20*   (2006.01)
  *F02B 29/04*   (2006.01)
  *B60K 6/22*    (2007.10)
  *B60W 20/00*   (2016.01)
  *F02N 11/08*   (2006.01)
  *B60W 20/15*   (2016.01)
  *F02D 41/00*   (2006.01)

(52) U.S. Cl.
  CPC ............... *F02D 2200/0414* (2013.01); *F02D 2200/0418* (2013.01)

(56) References Cited

U.S. PATENT DOCUMENTS

| | | | |
|---|---|---|---|
| 2015/0107566 | A1* | 4/2015 | Sugiyama ........... F02B 29/0443 123/568.12 |
| 2015/0369179 | A1 | 12/2015 | Hotta |
| 2016/0076470 | A1* | 3/2016 | Takamiya ........... F02D 13/0249 123/676 |
| 2016/0131017 | A1* | 5/2016 | Uto ........................... F01P 5/12 123/41.02 |
| 2016/0265458 | A1* | 9/2016 | Okada ................ F02D 41/0065 |
| 2017/0152790 | A1* | 6/2017 | Morishima ............. F01P 7/164 |
| 2017/0306898 | A1* | 10/2017 | Kim ...................... F02M 26/33 |
| 2018/0334951 | A1* | 11/2018 | Uto ........................ F02M 26/23 |

FOREIGN PATENT DOCUMENTS

| | | |
|---|---|---|
| JP | 2014-156804 A | 8/2014 |
| JP | 2015-94291 A | 5/2015 |
| JP | 2015-209793 A | 11/2015 |
| JP | 201821510 A | 2/2018 |
| KR | 10-2010-0017899 A | 2/2010 |
| KR | 1020170120426 A | 10/2017 |
| WO | 2009/056926 A2 | 5/2009 |
| WO | 2015/071723 A2 | 5/2015 |

\* cited by examiner

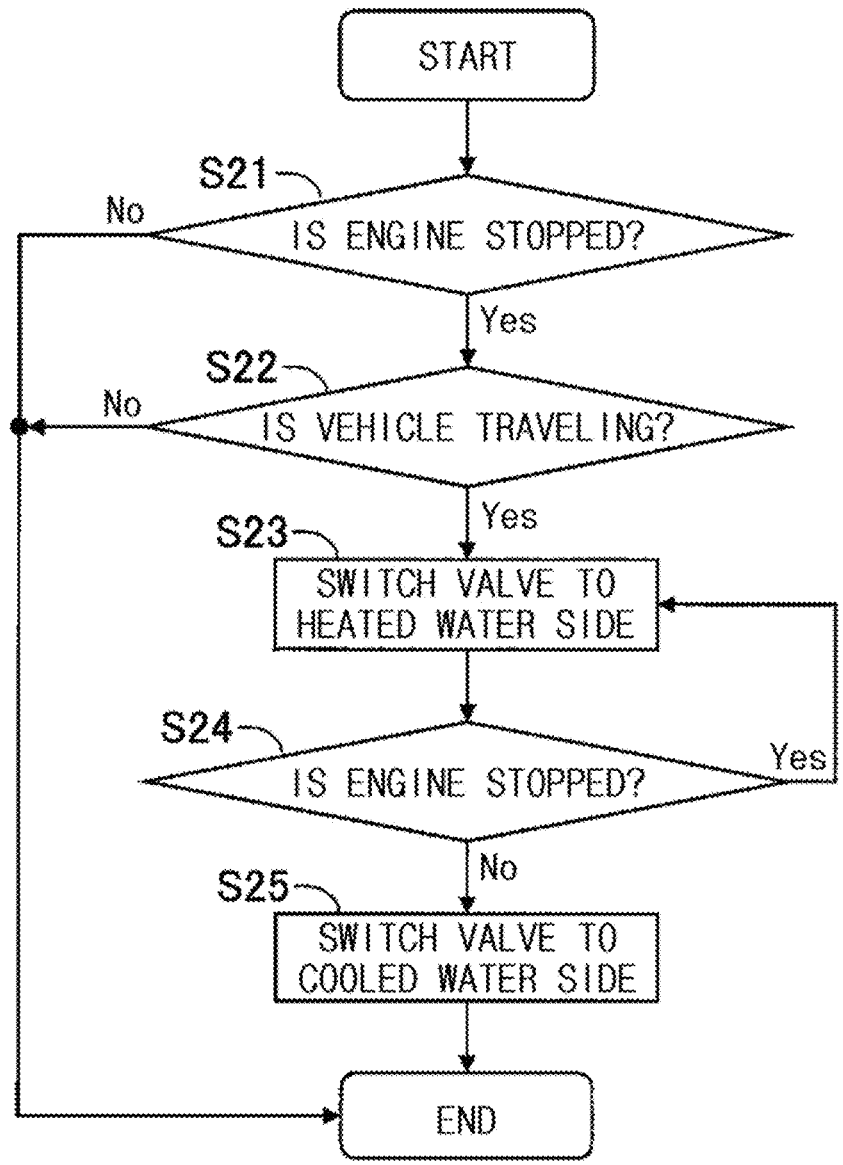

HYBRID VEHICLE

INCORPORATION BY REFERENCE

The disclosure of Japanese Patent Application No. 2018-023277 filed on Feb. 13, 2018 including the specification, drawings and abstract is incorporated herein by reference in its entirety.

BACKGROUND

1. Technical Field

The present disclosure relates to a hybrid vehicle that can travel in a state in which an engine is stopped, and particularly, to a hybrid vehicle of which an engine is provided with an EGR device.

2. Description of Related Art

In a hybrid vehicle including an engine and a motor as a power unit, stopping the engine during the travel of a vehicle is performed as a technique for improving fuel efficiency. Further, providing an EGR device in an engine as disclosed in, for example, Japanese Unexamined Patent Application Publication No. 2015-209793 (JP 2015-209793 A) is also known as a technique for improving fuel efficiency.

SUMMARY

In a case in which the engine is stopped during the travel of the vehicle, the engine is cooled by the traveling wind of the vehicle. In the engine including the EGR device, EGR gas is introduced into an intake passage during the operation of the engine and a gas mixture of fresh air and EGR gas is retained in the intake passage while the engine is stopped. For this reason, the moisture contained in the gas mixture may be condensed and condensed water may be generated in a case in which the intake passage is cooled by traveling wind. In a case in which condensed water enters cylinders at the time of start of the engine, there is a concern that the ignition of the gas mixture may be inhibited and misfire may be caused.

The disclosure provides a hybrid vehicle that can suppress condensed water to be generated in an intake passage of an engine due to a cooling effect caused by the traveling wind of the vehicle during the travel of the vehicle in a state in which the engine is stopped.

A hybrid vehicle according to a first aspect of the disclosure includes an engine including an EGR device, a motor, and a control device. The engine includes the EGR device and a water-cooled heat exchanger. The water-cooled heat exchanger is provided to perform heat exchange with gas flowing in the intake passage on a downstream side of an EGR gas-introduction portion of an intake passage into which EGR gas is introduced. The control device includes a processor for executing a program stored in a memory, and is programmed to execute condensed water-suppression control that supplies coolant having a temperature higher than the temperature of the gas heat-exchanged in the water-cooled heat exchanger to the water-cooled heat exchanger while the hybrid vehicle is traveling in a state in which the engine is stopped.

According to the hybrid vehicle having the above-mentioned configuration, even in a case in which the intake passage is cooled due to a cooling effect caused by the traveling wind of the vehicle, heat exchange is performed between gas and coolant having a temperature higher than the temperature of the gas in the water-cooled heat exchanger. Accordingly, since the fall of the temperature of the gas in the intake passage is suppressed, the generation of condensed water in the intake passage of the engine can be suppressed.

In the first aspect, the control device may acquire a coolant temperature that is the temperature of the coolant used for heat exchange in the water-cooled heat exchanger and a gas temperature that is the temperature of the gas heat-exchanged in the water-cooled heat exchanger during the execution of the condensed water-suppression control, and may control the supply of the coolant to the water-cooled heat exchanger on the basis of the comparison of the coolant temperature and the gas temperature. Specifically, the control device may be programmed to perform the supply of the coolant to the water-cooled heat exchanger only in a case in which the coolant temperature is higher than the gas temperature, and to pause the supply of the coolant to the water-cooled heat exchanger in a case in which the coolant temperature is equal to or lower than the gas temperature. In a case in which the coolant temperature is higher than the gas temperature, the coolant is supplied to the water-cooled heat exchanger so that heat is supplied to the gas from the coolant. Accordingly, the fall of the gas temperature can be suppressed. On the other hand, in a case in which the coolant temperature is equal to or lower than the gas temperature, the supply of the coolant to the water-cooled heat exchanger is paused. Accordingly, it is possible to prevent the gas temperature from falling due to following the coolant temperature lower than the gas temperature.

The coolant temperature is affected by the traveling wind of the vehicle. Therefore, the coolant temperature acquired by the control device may be a temperature that is changed according to the traveling wind. Specifically, the temperature of the coolant may be measured by a temperature sensor, a measured value obtained by the temperature sensor may be corrected according to a vehicle speed of the hybrid vehicle or a physical quantity (for example, an output of the motor) correlated with the vehicle speed, and the measured value that is corrected to a lower value as the vehicle speed is higher may be acquired as the coolant temperature. Alternatively, the temperature of the coolant may be estimated using a model that uses an amount of heat generated from the engine, an outdoor air temperature, and the vehicle speed of the hybrid vehicle or the physical quantity (for example, the output of the motor) correlated with the vehicle speed as parameters, and an estimated value, which is estimated using the model, may be acquired as the coolant temperature.

The control device may be configured to increase a flow rate of the coolant to be supplied to the water-cooled heat exchanger as a temperature difference between the coolant temperature and the gas temperature is reduced. When the flow rate of the coolant is kept constant, the amount of heat to be supplied to the gas from the coolant in a case in which the temperature difference is large is different from that in a case in which the temperature difference is small. In a case in which the amount of heat to be supplied is small, the fall of the gas temperature cannot be suppressed. Even though the amount of heat to be supplied is excessively large, energy required to supply the coolant is wasted. Since the flow rate of the coolant is regulated according to the temperature difference, the waste of energy required to supply the coolant can be suppressed while the generation of condensed water is reliably suppressed.

The control device may pause the supply of the coolant to the water-cooled heat exchanger when the gas temperature falls to a dew-point temperature. Since the supply of the coolant is paused at the point of time when conditions allowing the condensed water to be generated are satisfied, the waste of energy required to supply the coolant can be prevented.

In the first aspect, the water-cooled heat exchanger may be configured to be selectively connected to any one of a first coolant circuit where the engine is not included in a flow passage for the coolant and a second coolant circuit where the engine is included in the flow passage for the coolant. The control device may be programmed to connect the water-cooled heat exchanger to the first coolant circuit during an operation of the engine and to connect the water-cooled heat exchanger to the second coolant circuit during the execution of the condensed water-suppression control.

The coolant circulating in the second coolant circuit absorbs the heat of the engine, so that the temperature of the coolant circulating in the second coolant circuit becomes higher than the temperature of coolant circulating in the first coolant circuit and becomes higher than the gas temperature. Therefore, since the water-cooled heat exchanger is connected to the second coolant circuit while the hybrid vehicle is traveling in a state in which the engine is stopped, the fall of the gas temperature can be suppressed by heat exchange between the gas and high-temperature coolant circulating in the second coolant circuit. On the other hand, since the water-cooled heat exchanger is connected to the first coolant circuit during the operation of the engine, the gas temperature falls. As a result, charging efficiency of the engine can be increased.

As described above, according to the aspects of the disclosure, it is possible to suppress condensed water to be generated in an intake passage of an engine due to a cooling effect caused by the traveling wind of a vehicle during the travel of the vehicle in a state in which the engine is stopped.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14 is a flowchart illustrating condensed water-suppression control according to the fourth embodiment of the disclosure.

DETAILED DESCRIPTION OF EMBODIMENTS

Embodiments of the disclosure will be described below with reference to the drawings. When numerals, such as the number, the quantity, the amount, and the range of the respective elements, are mentioned in the following embodiments, except for a case in which the numerals are particularly clarified and in which the numerals are clearly specified in principle, the disclosure is not limited to the mentioned numerals. Further, structures, steps, and the like described in the embodiments to be described below are not necessarily essential for the disclosure except for a case in which the structures, the steps, and the like are particularly clarified and a case in which the structures, the steps, and the like are clearly specified in principle.

1. First Embodiment 1-1. Configuration of Hybrid System of Hybrid Vehicle

Figure 1:
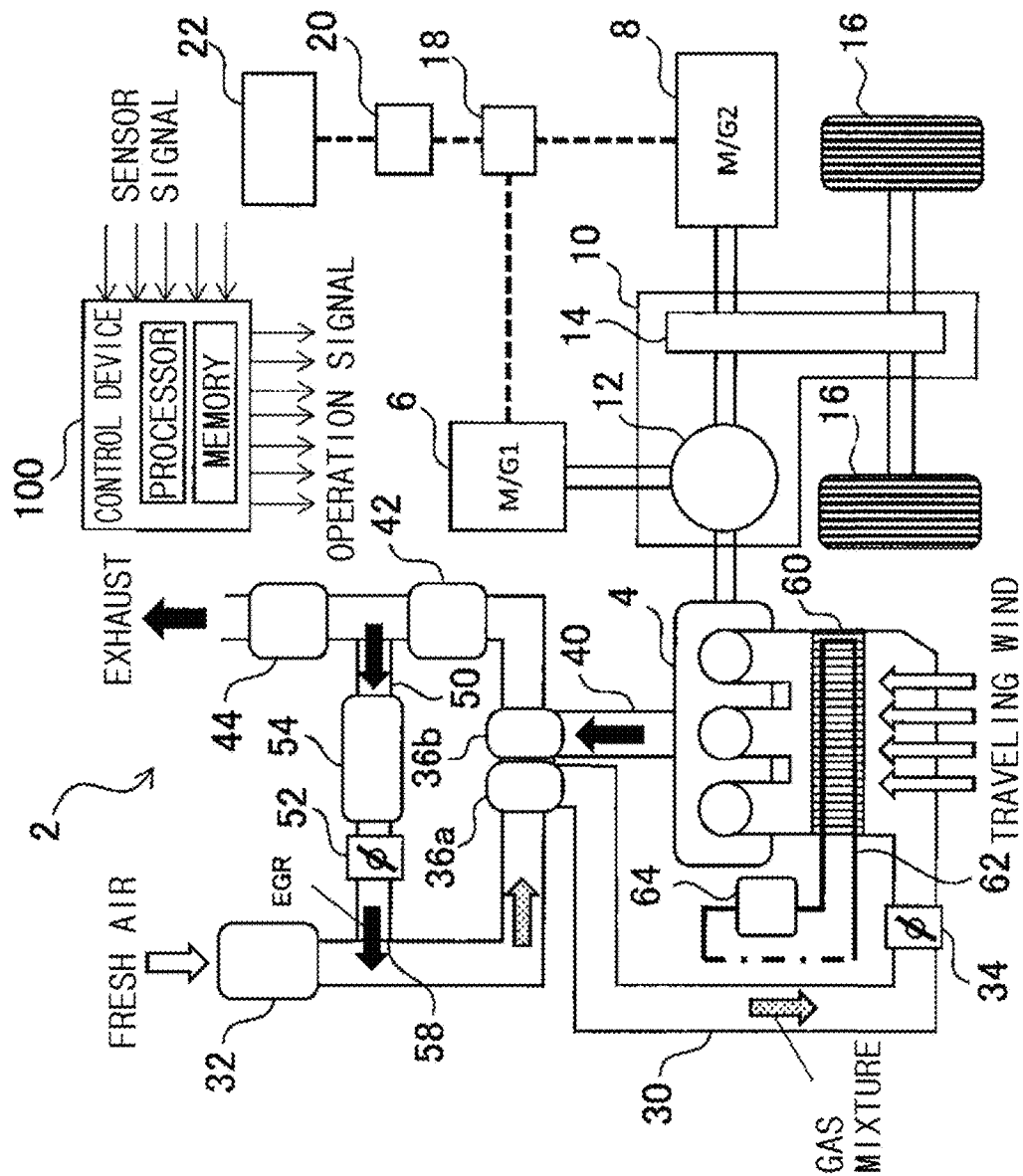
FIG. 1 is a diagram illustrating the configuration of a hybrid system of a hybrid vehicle according to a first embodiment of the disclosure.

FIG. 1 is a diagram illustrating the configuration of a hybrid system of a hybrid vehicle according to this embodiment. As illustrated in FIG. 1, the hybrid vehicle 2 includes an engine 4 as one power unit for driving wheels 16. The engine 4 is an internal combustion engine that outputs power by the combustion of hydrocarbon fuel, such as gasoline or light oil. The configuration of an air intake and exhaust system included in the engine 4 is illustrated in FIG. 1.

The air intake and exhaust system illustrated in FIG. 1 is an air intake and exhaust system that includes a supercharger and an EGR device. The supercharger of this embodiment is a turbo-supercharger that supercharges intake air by the energy of exhaust gas. A compressor 36a of the supercharger is provided on an intake passage 30 downstream of an air cleaner 32, and a turbine 36b of the supercharger is provided on an exhaust passage 40. A throttle valve 34 that regulate the flow rate of air to be taken into the engine 4 is provided on the intake passage 30 downstream of the compressor 36a. A DPF 42 is provided on the exhaust passage 40 downstream of the turbine 36b, and a catalyst 44 is provided downstream of the DPF 42.

The EGR device of this embodiment is an LPL-EGR device. An EGR passage 50, which is branched from the exhaust passage 40 downstream of the turbine 36b, in detail, from a portion of the exhaust passage 40 between the DPF 42 and the catalyst 44, is connected to an EGR gas-introduction portion 58 of the intake passage 30. The EGR gas-introduction portion 58 is positioned between the air cleaner 32 and the compressor 36a. The EGR passage 50 is provided with an EGR cooler 54 that cools EGR gas and an EGR valve 52 that regulates the flow rate of EGR gas to be recirculated to the engine 4.

An intercooler 60 that is integrated with a surge tank is provided on the intake passage 30 downstream of the throttle valve 34. The intercooler 60 is a water-cooled heat exchanger that performs heat exchange between gas (a gas mixture of fresh air and EGR gas) present in the surge tank and coolant. Since gas, of which the temperature rises due to compression performed by the compressor 36a, is cooled by the intercooler 60 during the operation of the engine 4, charging efficiency of the engine 4 is increased. A coolant circuit 62 in which coolant circulates is connected to the intercooler 60. The coolant circuit 62 is provided with an electric pump 64 that can be operated while the engine 4 is stopped. Further, a radiator (not illustrated) may be provided in the coolant circuit 62. Hereinafter, coolant supplied to the intercooler 60 will be written as IC coolant so as to be distinguished from coolant supplied to the EGR cooler 54 and coolant supplied to the engine 4.

The hybrid vehicle 2 includes a first motor generator 6 and a second motor generator 8 that are electric motors capable of generating electricity, as other power units for driving the wheels 16. Each of the first motor generator 6 and second motor generator 8 is an AC synchronous motor generator that has both a function as a motor for outputting torque by supplied electric power and a function as a generator for converting input mechanical power into electric power. The first motor generator 6 is mainly used as a generator, and the second motor generator 8 is mainly used as a motor. Hereinafter, for the description easy to understand, the first motor generator 6 will be simply written as a generator 6 and the second motor generator 8 will be simply written as a motor 8.

The engine 4, the generator 6, and the motor 8 are connected to the wheels 16 by a power transmission mechanism 10. The power transmission mechanism 10 includes a power distribution mechanism 12 and a speed reduction mechanism 14. The power distribution mechanism 12 is, for example, a planetary gear unit, and distributes torque that is output from the engine 4 to the generator 6 and the wheels 16. Torque that is output from the engine 4 or torque that is output from the motor 8 is transmitted to the wheels 16 via the speed reduction mechanism 14.

The generator 6 regenerates electric power by torque that is supplied via the power distribution mechanism 12. Since electric power is regenerated by the generator 6 while torque is not output from the engine 4 and the motor 8, a braking force is transmitted to the wheels 16 from the generator 6 via the power transmission mechanism 10. As a result, the hybrid vehicle 2 is decelerated. That is, the hybrid vehicle 2 can perform regenerative braking by the generator 6.

The generator 6 and the motor 8 give electric power to and receive electric power from a battery 22 via an inverter 18 and a converter 20. The inverter 18 converts electric power, which is stored in the battery 22, into AC from DC and supplies the converted electric power to the motor 8, and converts electric power, which is generated by the generator 6, into DC from AC and stores the converted electric power in the battery 22. Accordingly, the battery 22 is charged with electric power that is generated by the generator 6, and is discharged by electric power that is consumed by the motor 8.

The hybrid vehicle 2 includes a control device 100. The control device 100 is an electronic control unit (ECU) that includes at least one processor and at least one memory. Various programs and various data (including a map) for the control of the hybrid vehicle 2 are stored in the memory. The programs that are stored in the memory are executed by the processor, so that various functions are realized in the control device 100. For example, the control of travel, which is performed by the operation of the engine 4, the generator 6, the motor 8, the power transmission mechanism 10, and the like, is one of the functions that are performed by the execution of the programs. Meanwhile, the control device 100 may be formed of a plurality of ECUs.

1-2. Characteristic Functions of Control Device of Hybrid Vehicle 1-2-1. Outline of Condensed Water-Suppression Control During the operation of the engine 4, EGR gas is introduced into the intake passage 30. Since a large amount of moisture is contained in EGR gas, condensed water is generated in a case in which a gas mixture of air and the EGR gas is cooled. Condensed water-suppression control for suppressing the generation of condensed water in the intake passage 30 is included in the functions of the control device 100.

The hybrid vehicle 2 to which the disclosure is applied can travel in a state in which the engine 4 is stopped. In this case, since traveling wind blows against the engine 4, a gas mixture in the intake passage 30 is likely to be cooled due to a cooling effect caused by traveling wind. Particularly, in a case in which the engine 4 is mounted transversely and the intercooler 60 is integrated with the surge tank, traveling wind is likely to blow against the intercooler 60. Accordingly, the intercooler 60 is cooled by traveling wind, so that condensed water is likely to be generated in the intercooler 60. The condensed water-suppression control is control for suppressing the generation of condensed water in the intake passage 30, particularly, in the intercooler 60 during the travel of the hybrid vehicle 2 in a state in which the engine 4 is stopped. In the condensed water-suppression control, the fall of a gas temperature in the intercooler 60 is suppressed using the heat of IC coolant supplied to the intercooler 60.

1-2-2. Detail of Condensed Water-Suppression Control

Figure 2:
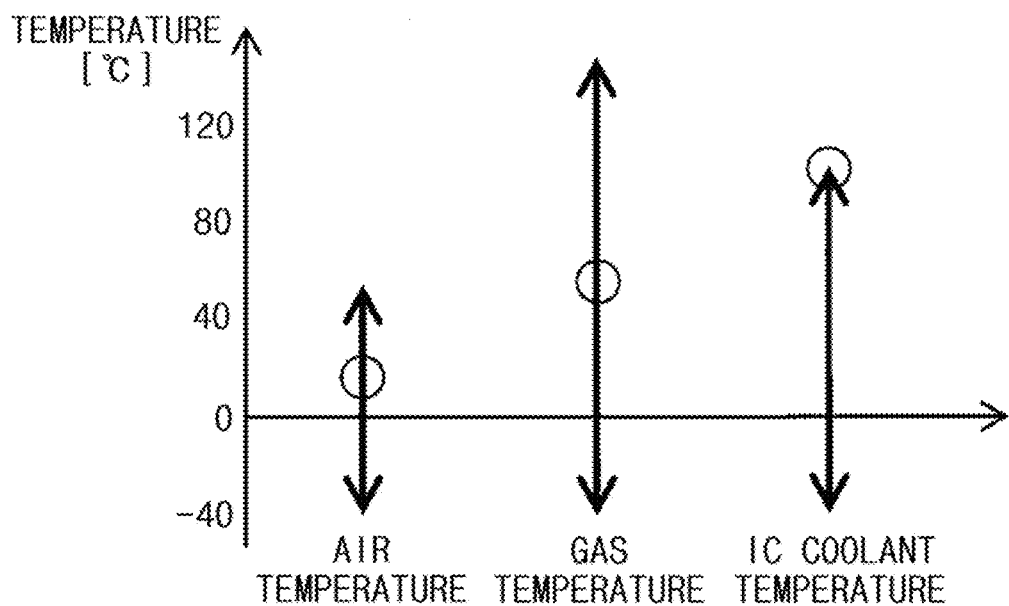
FIG. 2 is a diagram illustrating a temperature relationship between an air temperature, a gas temperature, and an IC coolant temperature in a case in which an engine is stopped after sufficient warming-up.

FIG. 2 is a diagram illustrating a temperature relationship between an air temperature (outdoor air temperature), a gas temperature in the intercooler 60, and an IC coolant temperature in a case in which the engine 4 is stopped after sufficient warming-up, with circular marks respectively. Here, the IC coolant temperature is not the temperature of IC coolant in the intercooler 60 where heat exchange is performed between IC coolant and residual gas remaining in the intercooler 60, and is the temperature of IC coolant that is supplied to the intercooler 60 from the pump 64. Further, the temperature range of each of the air temperature, the gas temperature, and the IC coolant temperature is illustrated in FIG. 2 by a two-way arrow. When the IC coolant temperature is higher than the gas temperature as illustrated in FIG. 2, the supply of IC coolant to the intercooler 60 is continued even after the engine 4 is stopped, so as to supply heat to residual gas in the intercooler 60 from IC coolant. Accordingly, the fall of the gas temperature can be suppressed.

Hereinafter, in a case in which the relationship between the gas temperature and the IC coolant temperature at the time in which the engine 4 is stopped is the temperature relationship illustrated in FIG. 2, a result that is obtained when condensed water-suppression control is not performed and a result that is obtained when condensed water-suppression control is performed will be described with reference to FIG. 3.

Figure 3:
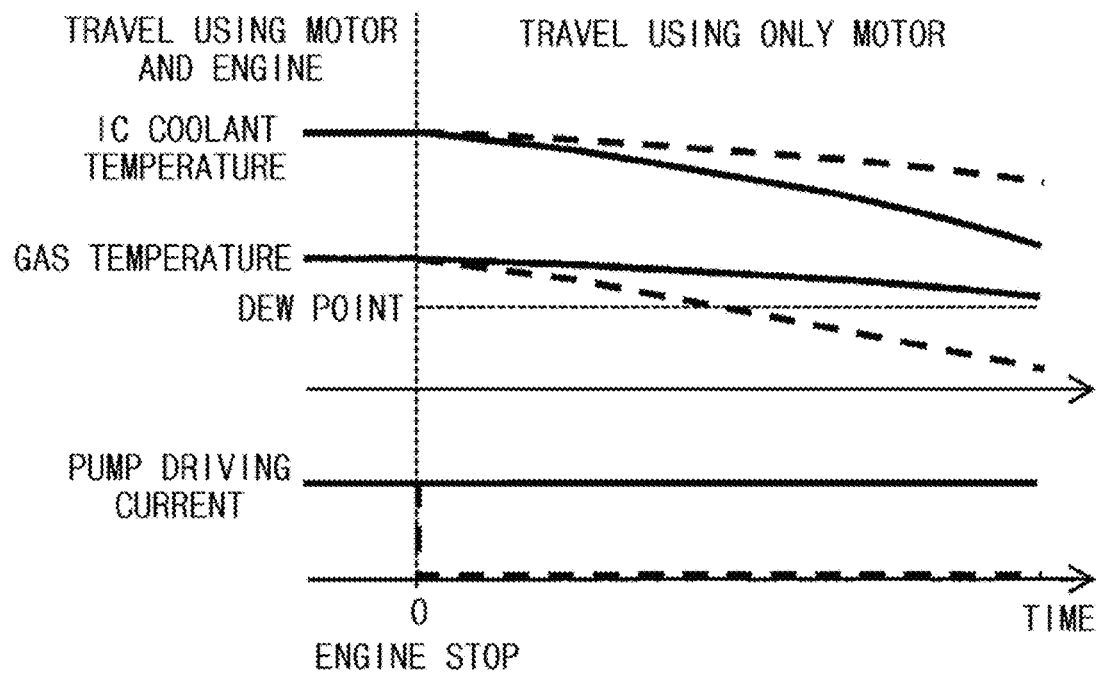
FIG. 3 is a diagram illustrating condensed water-suppression control under the temperature relationship illustrated in FIG. 2.

A change in each temperature with time in a case in which the pump 64 is stopped at the same time as the engine 4 is stopped, that is, a case in which condensed water-suppression control is not performed is illustrated in FIG. 3 by a broken line. When the pump 64 is stopped at the same time as the engine 4 is stopped, the circulation of IC coolant is stopped and the replacement of IC coolant in the intercooler 60 does not occur. Accordingly, since heat exchange is not performed between IC coolant and residual gas, the IC coolant temperature is maintained at a high temperature. On the other hand, since the supply of heat caused by heat exchange with the IC coolant cannot occur and a cooling effect caused by traveling wind is obtained, the gas temperature in the intercooler 60 significantly falls. Eventually, when the gas temperature falls to a temperature equal to or lower than a dew-point temperature, condensed water starts to be generated in the intercooler 60.

In contrast, when the pump 64 is driven even after the engine 4 is stopped, that is, when condensed water-suppression control is performed, a change in each temperature with time is illustrated in FIG. 3 likewise by a solid line. Since the pump 64 is driven even after the engine 4 is stopped, IC coolant circulates between the intercooler 60 and the pump 64 and the replacement of IC coolant in the intercooler 60 is continued. Accordingly, heat exchange is performed between IC coolant flowing in the intercooler 60 and residual gas in the intercooler 60. The IC coolant temperature gradually falls due to the heat exchange and a cooling effect caused by traveling wind, but the fall of the gas temperature in the intercooler 60 is suppressed by the supply of heat from IC coolant. Accordingly, since the time required the gas temperature to fall to a temperature equal to or lower than the dew-point temperature from the stop of the engine 4, can be lengthened, the generation of condensed water in the intercooler 60 is suppressed.

Figure 4:
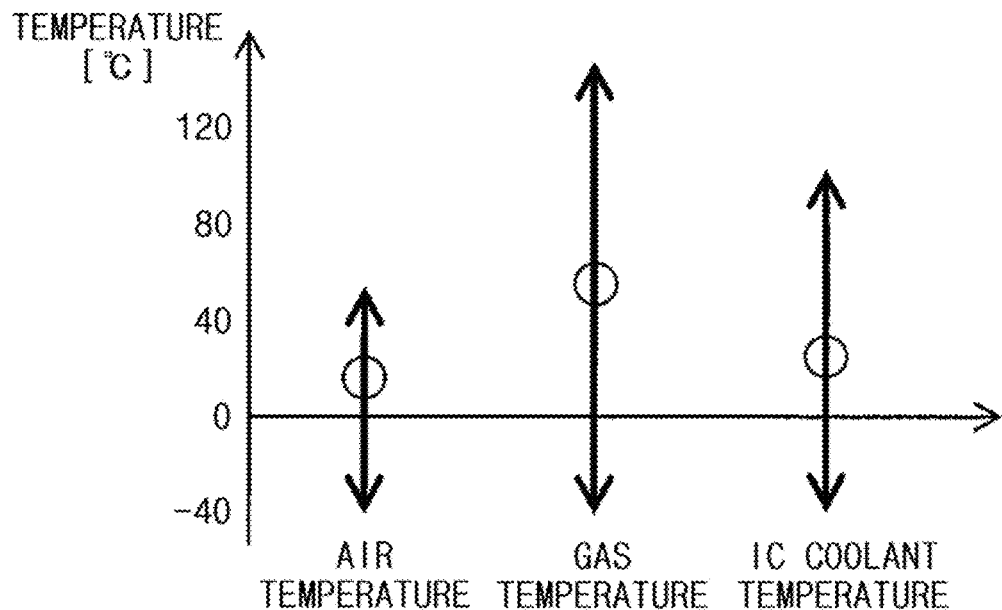
FIG. 4 is a diagram illustrating a temperature relationship between an air temperature, a gas temperature, and an IC coolant temperature in a case in which the engine is stopped in a state in which warming-up is insufficient.

FIG. 4 is a diagram illustrating a temperature relationship between an air temperature, a gas temperature in the intercooler 60, and an IC coolant temperature when the engine 4 is stopped in a state in which warming-up is insufficient, with circular marks respectively. Further, the temperature range of each of the air temperature, the gas temperature, and the IC coolant temperature is illustrated in FIG. 4 by a two-way arrow. When the IC coolant temperature is lower than the gas temperature as illustrated in FIG. 4, the supply of IC coolant to the intercooler 60 is stopped after the engine 4 is stopped so as to suppress the transfer of heat to IC coolant from residual gas present in the intercooler 60. Accordingly, the fall of the gas temperature can be suppressed.

Hereinafter, in a case in which a relationship between the gas temperature and the IC coolant temperature at the time of stop of the engine 4 is the temperature relationship illustrated in FIG. 4, a result that is obtained when condensed water-suppression control is not performed and a result that is obtained when condensed water-suppression control is performed will be described with reference to FIG. 5.

Figure 5:
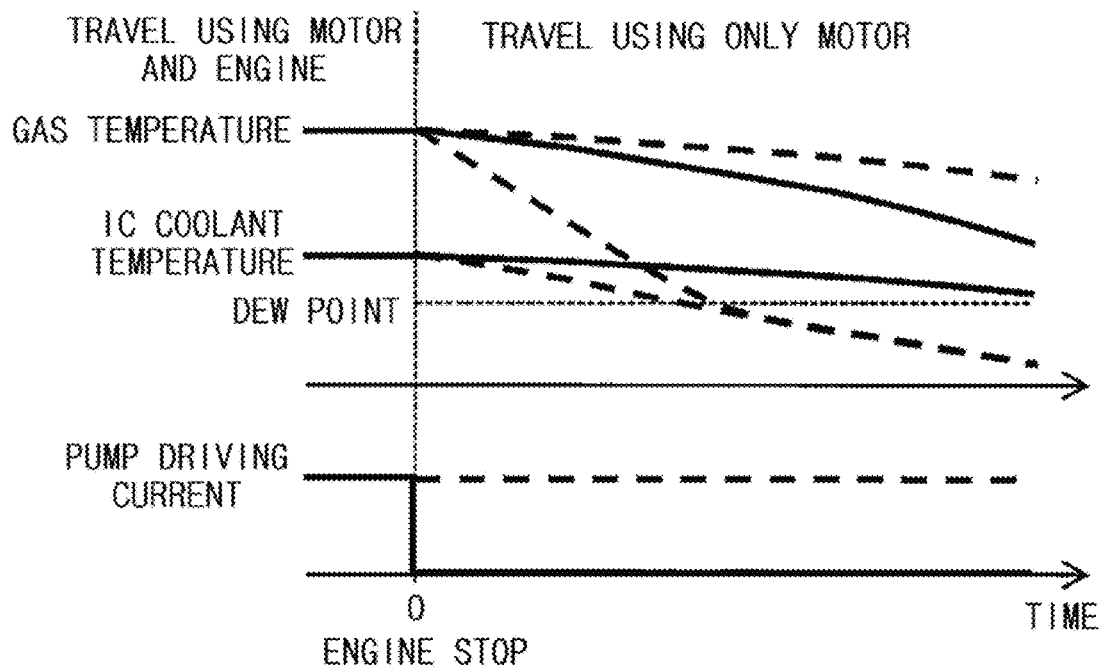
FIG. 5 is a diagram illustrating condensed water-suppression control under the temperature relationship illustrated in FIG. 4.

When the pump 64 is driven even after the engine 4 is stopped, that is, condensed water-suppression control is not performed, a change in each temperature with time is illustrated in FIG. 5 by a broken line. Since the pump 64 is driven even after the engine 4 is stopped, IC coolant circulates between the intercooler 60 and the pump 64 and the replacement of IC coolant in the intercooler 60 is continued. Accordingly, heat exchange is performed between IC coolant flowing in the intercooler 60 and residual gas in the intercooler 60. The IC coolant temperature gradually falls due to this heat exchange and a cooling effect caused by traveling wind. On the other hand, since heat is removed from gas by heat exchange with IC coolant having a temperature lower than the gas temperature, the gas temperature in the intercooler 60 falls while following the coolant temperature. Eventually, when the gas temperature falls to a temperature equal to or lower than the dew-point temperature, condensed water starts to be generated in the intercooler 60.

In contrast, When the pump 64 is stopped at the same time as the engine 4 is stopped, that is, condensed water-suppression control is performed, a change in each temperature with time is illustrated in FIG. 5 likewise by a solid line. When the pump 64 is stopped at the same time as the engine 4 is stopped, the circulation of IC coolant is stopped and the replacement of IC coolant in the intercooler 60 does not occur. Accordingly, since cooling caused by traveling wind is not performed, the fall of the IC coolant temperature is suppressed. On the other hand, since the removal of heat caused by heat exchange with IC coolant is suppressed, the fall of the gas temperature in the intercooler 60 is suppressed. Accordingly, since the time required the gas temperature to fall to a temperature equal to or lower than the dew-point temperature from the stop of the engine 4, can be lengthened, the generation of condensed water in the intercooler 60 is suppressed.

Figure 6:
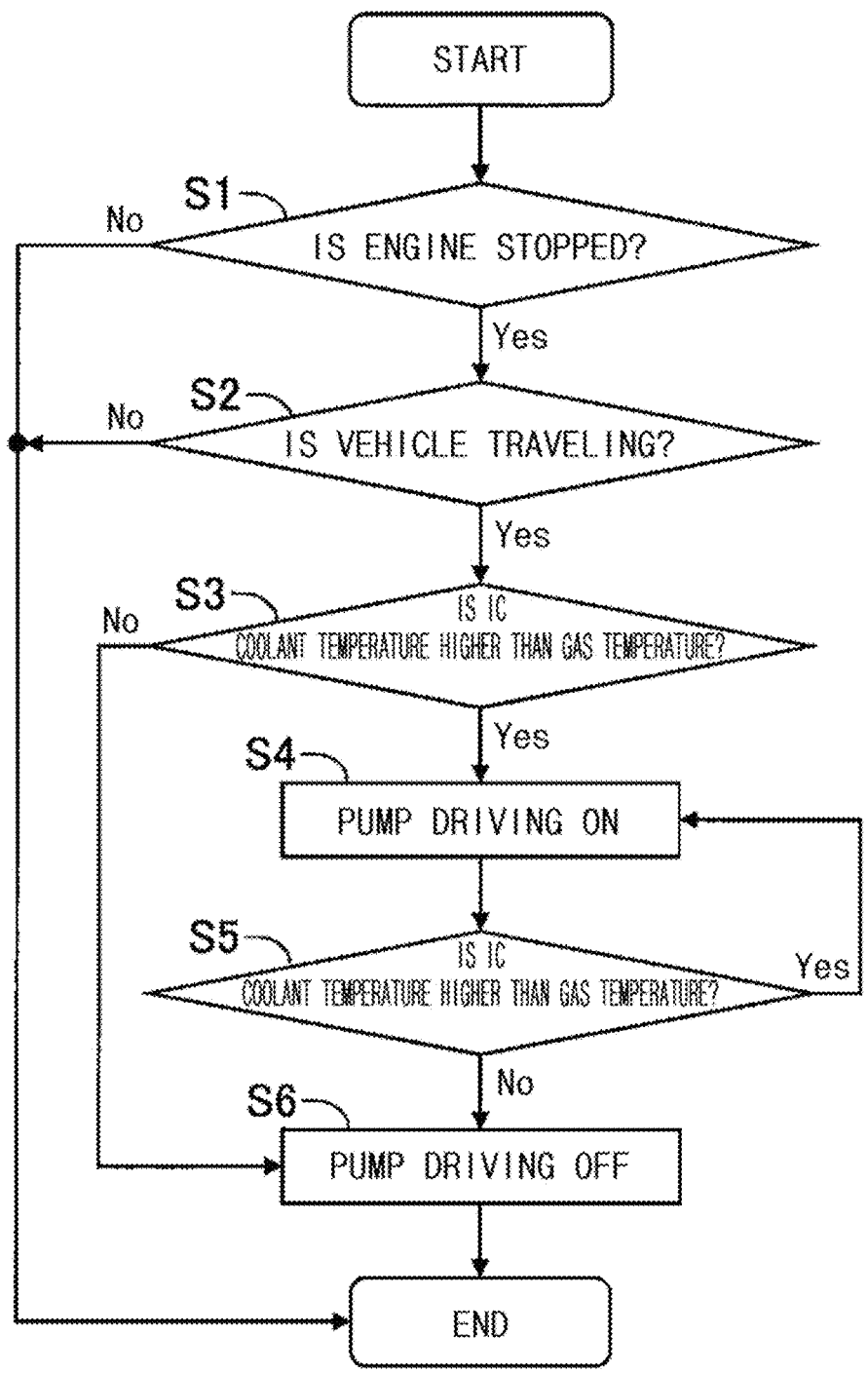
FIG. 6 is a flowchart illustrating condensed water-suppression control according to the first embodiment of the disclosure.

FIG. 6 is a flowchart illustrating the control flow of the above-mentioned condensed water-suppression control. According to the flowchart illustrated in FIG. 6, first, it is determined in Step S1 whether or not the engine 4 is stopped. A case in which the engine 4 is stopped may be defined as, for example, a case in which the speed of the engine is zero or a case in which the amount of injected fuel is zero. In a case in which the engine 4 is not stopped, this control flow ends.

When the engine 4 is stopped, it is then determined in Step S2 whether or not a vehicle is traveling. A case in which the vehicle is traveling may be defined as, for example, a case in which a vehicle speed is higher than zero. In a case in which the vehicle is not traveling, that is, in a case in which the vehicle is stopped, this control flow ends.

In a case in which the vehicle is traveling, it is then determined in Step S3 whether or not an IC coolant temperature is higher than a gas temperature. As described above, the IC coolant temperature in this embodiment is the temperature of IC coolant that is supplied to the intercooler 60 from the pump 64. A measured value obtained from a temperature sensor is used in Step S3 as the IC coolant temperature. The temperature sensor is provided, for example, at the outlet of the pump 64 of the coolant circuit 62. Alternatively, an estimated value obtained using a temperature model, which uses at least the heat generation amount of the engine 4 and an air temperature (outdoor air temperature) as parameters, may be used as the IC coolant temperature. Further, in Step S3, for example, a measured value obtained from a temperature sensor mounted on the surge tank is used as the gas temperature.

When the IC coolant temperature is equal to or lower than the gas temperature, the drive of the pump 64 is stopped in Step S6. Accordingly, when IC coolant is circulated in this state, the gas temperature falls following the coolant temperature lower than the gas temperature. The drive of the pump 64 is stopped so as to stop the supply of IC coolant to the intercooler 60. Accordingly, the fall of the gas temperature and the generation of condensed water caused by the fall of the gas temperature are suppressed.

When the IC coolant temperature is higher than the gas temperature, the drive of the pump 64 is performed in Step S4. By driving the pump 64 to circulate IC coolant, heat exchange between IC coolant and residual gas in the intercooler 60 is performed. The fall of the gas temperature is suppressed by the supply of heat from IC coolant, so that the generation of condensed water is suppressed.

Next, it is determined again in Step S5 whether or not the IC coolant temperature is higher than the gas temperature. That is, the comparative determination of the IC coolant temperature and the gas temperature is always continuously performed in condensed water-suppression control. When the IC coolant temperature is higher than the gas temperature, the drive of the pump 64 is continuously performed in Step S4. When the IC coolant temperature is equal to or lower than the gas temperature, the drive of the pump 64 is stopped in Step S6 and this control flow ends.

2. Second Embodiment

2-1. Configuration of Hybrid System of Hybrid Vehicle

The configuration of a hybrid system of a hybrid vehicle according to this embodiment is the same as that of the hybrid system of the hybrid vehicle according to the first embodiment illustrated in FIG. 1. Accordingly, the description of the configuration of the hybrid system will be omitted.

2-2. Characteristic Functions of Control Device of Hybrid Vehicle

2-2-1. Outline of Condensed Water-Suppression Control

Figure 7:
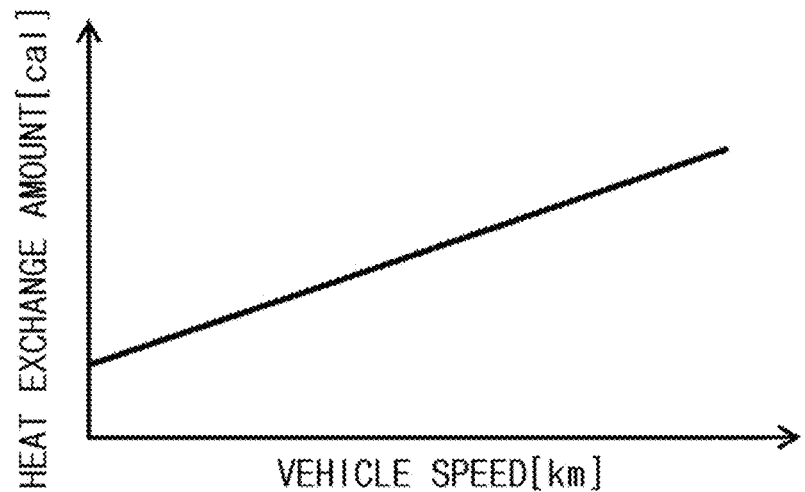
FIG. 7 is a diagram illustrating a relationship between the heat exchange amount between outdoor air and IC coolant in an intercooler, and a vehicle speed.
Figure 8:
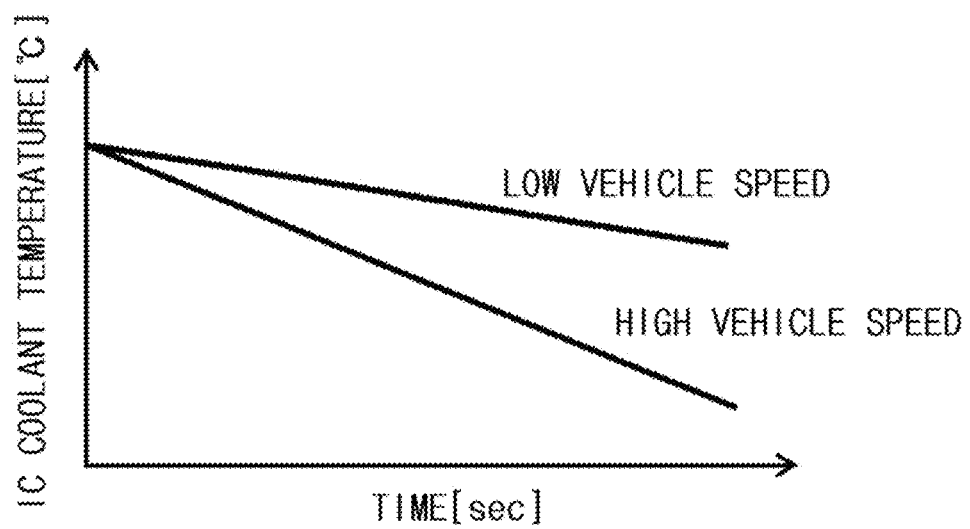
FIG. 8 is a diagram illustrating a relationship between a change in an IC coolant temperature with time and a vehicle speed.

FIG. 7 is a diagram illustrating a relationship between the heat exchange amount between outdoor air and IC coolant in an intercooler 60 and a vehicle speed. While the engine 4 is stopped, the heat exchange occurs between outdoor air that flows outside the intercooler 60 and IC coolant in the intercooler 60. As the flow speed of outdoor air is higher, that is, a vehicle speed is higher, the heat exchange amount is larger. The heat exchange amount affects the reduction rate of the IC coolant temperature after the engine 4 is stopped. FIG. 8 is a diagram illustrating a relationship between a change in the IC coolant temperature with time and a vehicle speed. In a case in which a vehicle speed is high, the reduction rate of the IC coolant temperature is higher than that in a case in which a vehicle speed is low. Accordingly, the IC coolant temperature more quickly comes close to an outdoor air temperature. The condensed water-suppression control of this embodiment is characterized in that an influence of a vehicle speed on the IC coolant temperature is considered.

2-2-2. Detail of Condensed Water-Suppression Control

In the condensed water-suppression control of the first embodiment, as an example, the IC coolant temperature is measured by the temperature sensor (not illustrated) provided at the outlet of the pump 64 of the coolant circuit 62. A temperature difference corresponding to the heat exchange amount between outdoor air and IC coolant is caused between a measured value that is obtained from the temperature sensor and the actual temperature of IC coolant that is to exchange heat with residual gas in the intercooler 60. As the heat exchange amount is larger, that is, as a vehicle speed is higher, the temperature difference between the measured value obtained from the temperature sensor and the actual temperature is larger. Accordingly, in the condensed water-suppression control of this embodiment, a measured value obtained from the temperature sensor is corrected with a vehicle speed and a corrected measured value is acquired as the IC coolant temperature.

Specifically, in the condensed water-suppression control of this embodiment, the IC coolant temperature is calculated from the following equation 1. Here, f (vehicle speed) is a function of a vehicle speed, and is defined to return 1 as a maximum value when a vehicle speed is zero and to return a smaller value as a vehicle speed is higher.

$$IC\text{ coolant temperature} = \text{measured value} \times f(\text{vehicle speed}) \quad \text{Equation 1}$$

In the condensed water-suppression control of the first embodiment, as another example, an estimated value obtained by the temperature model, which uses at least the heat generation amount from the engine 4 and an air temperature (outdoor air temperature) as parameters, is used as the IC coolant temperature. However, this temperature model is a model that estimates the temperature of IC coolant at the outlet of the pump 64 of the coolant circuit 62, and an influence of a vehicle speed on temperature is not considered in this temperature model. Accordingly, in the condensed water-suppression control of this embodiment, a new mode that uses at least the heat generation amount from the engine 4, an air temperature, and a vehicle speed as parameters is prepared, and an estimated value estimated using this model is used as the IC coolant temperature.

Specifically, in the condensed water-suppression control of this embodiment, the IC coolant temperature is calculated from the following equation 2. Here, g (the heat generation amount, air temperature, vehicle speed) is a function that represents a model for estimating the IC coolant temperature, and is defined to return a smaller value as a vehicle speed is higher in a case in which the heat generation amount and the air temperature are constant.

$$IC\text{ coolant temperature} = g(\text{heat generation amount, air temperature, vehicle speed}) \quad \text{Equation 2}$$

As in the first embodiment, the control flow of the condensed water-suppression control of this embodiment can be represented by the flowchart illustrated in FIG. 6. Here, a value, which is calculated from above-described Equation 1 or Equation 2, is input as the IC coolant temperature in the processing of Steps S3 and S5 of the flowchart illustrated in FIG. 6.

Figure 9:
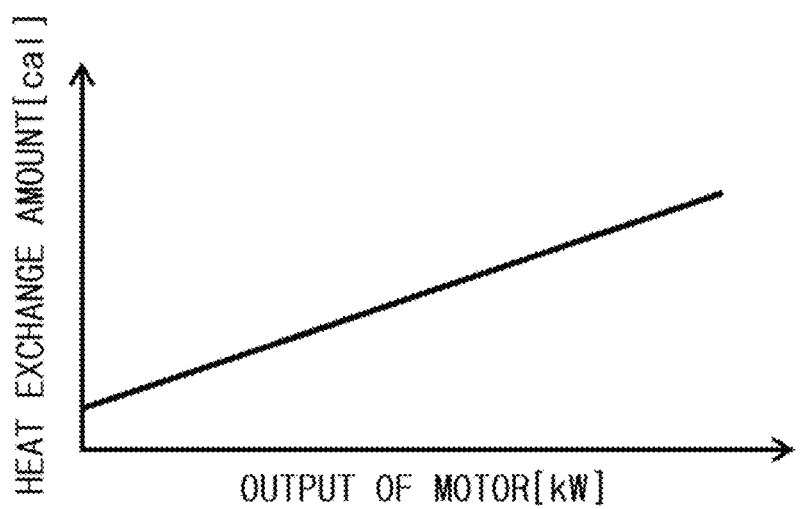
FIG. 9 is a diagram illustrating a relationship between the heat exchange amount between outdoor air and IC coolant in the intercooler, and the output of a motor.

Meanwhile, in a modification of the condensed water-suppression control of this embodiment, a physical quantity that is correlated with a vehicle speed may be used instead of a vehicle speed in the calculation of the IC coolant temperature. Specifically, the output of the motor 8 may be used instead of a vehicle speed. The reason for this is that a vehicle speed is substantially proportional to the output of the motor 8 in a case in which the engine 4 is stopped and a hybrid vehicle travels using only the output of the motor 8. As illustrated in FIG. 9, the same relationship as the relationship illustrated in FIG. 7, which is established between the heat exchange amount in the intercooler 60 and a vehicle speed, is also established between the heat exchange amount in the intercooler 60 and the output of the motor 8. Therefore, the output of the motor 8 can be used instead of a vehicle speed as a parameter in above-described Equation 1 or Equation 2.

3. Third Embodiment

3-1. Configuration of Hybrid System of Hybrid Vehicle

The configuration of a hybrid system of a hybrid vehicle according to this embodiment is basically the same as that of the hybrid system of the hybrid vehicle according to the first embodiment illustrated in FIG. 1. Here, although not illustrated, a flow regulating valve for regulating the flow rate of IC coolant supplied to the intercooler 60 is provided at the outlet of the pump 64 of the coolant circuit 62. The flow regulating valve has only to be capable of regulating a flow rate continuously or in multiple stages, and the type and structure of the flow regulating valve and a method of driving the flow regulating valve are not limited. As a modification, a flow rate may be regulated continuously or in multiple stages by the pump 64 itself instead of the valve.

3-2. Characteristic Functions of Control Device of Hybrid Vehicle

3-2-1. Outline of Condensed Water-Suppression Control

In the first embodiment, when the IC coolant temperature is higher than the gas temperature, the pump 64 is driven to supply IC coolant to the intercooler 60. However, an effect of suppressing the fall of the gas temperature by supplying IC coolant to the intercooler 60 depends on the temperature difference between the IC coolant temperature and the gas temperature. When the temperature difference is large, the effect is obtained even though the flow rate of IC coolant is low. In contrast, when the temperature difference is small, the effect cannot be sufficiently obtained unless the flow rate of IC coolant is set to be high. Accordingly, when the flow rate of IC coolant is constant, the flow rate of IC coolant has to set to be high to obtain the effect above a certain level regardless of the temperature difference.

However, when a temperature difference is large and an effect of suppressing the fall of a gas temperature is large in a case in which the flow rate of IC coolant is set to be high, the pump 64 is made to waste energy. Accordingly, in the condensed water-suppression control of this embodiment, the temperature difference between the IC coolant temperature and the gas temperature is calculated and the flow rate of IC coolant to be supplied to the intercooler 60 is regulated according to the temperature difference instead of simply comparing the IC coolant temperature and the gas temperature.

3-2-2. Detail of Condensed Water-Suppression Control

Figure 10:
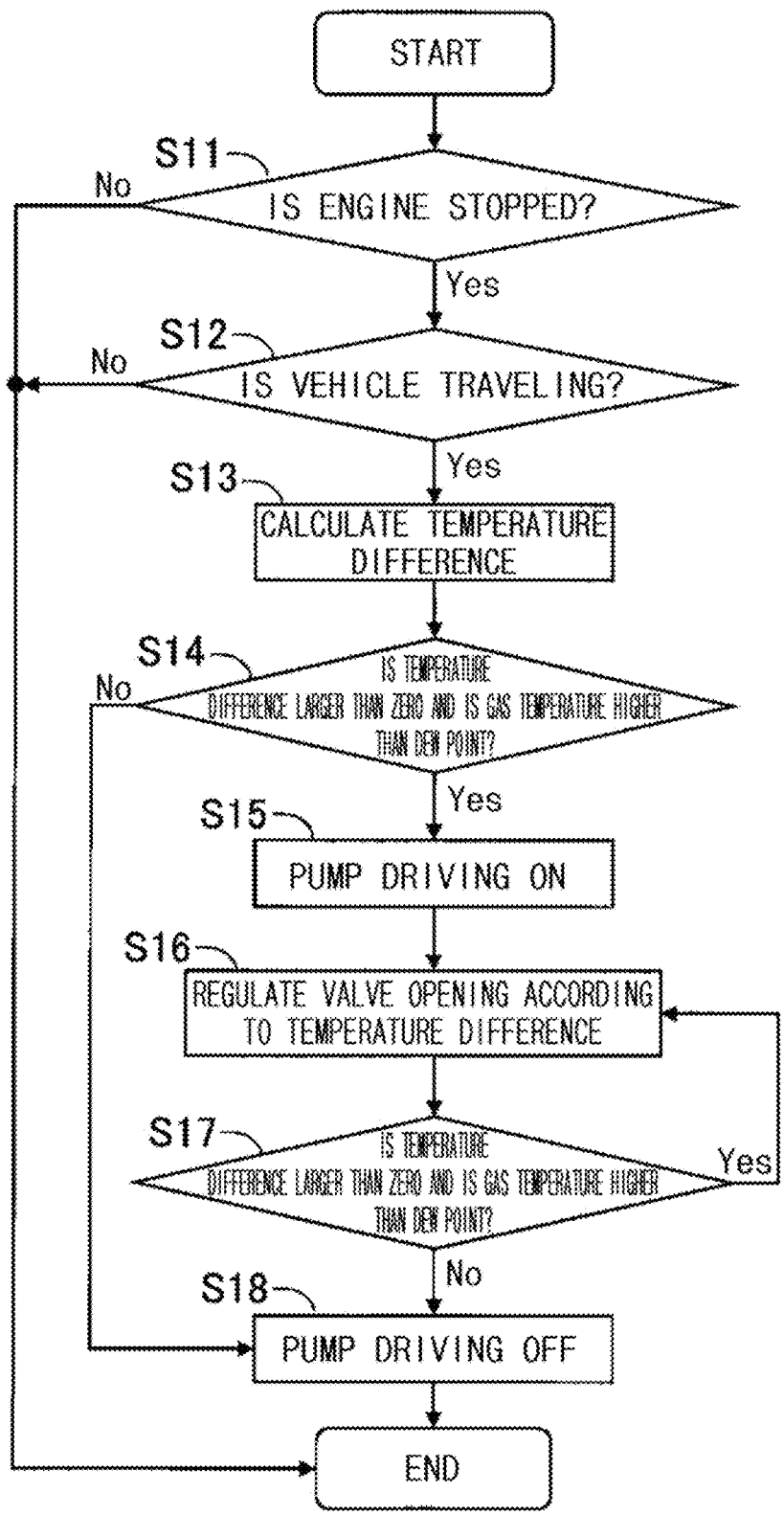
FIG. 10 is a flowchart illustrating condensed water-suppression control according to a third embodiment of the disclosure.

FIG. 10 is a flowchart illustrating the control flow of condensed water-suppression control of this embodiment. According to the flowchart illustrated in FIG. 10, first, it is determined in Step S11 whether or not the engine 4 is stopped. When the engine 4 is not stopped, the control flow ends.

When the engine 4 is stopped, it is then determined in Step S12 whether or not a vehicle is traveling. When the vehicle is not traveling, that is, the vehicle is stopped, the control flow ends.

When the vehicle is traveling, the temperature difference between the IC coolant temperature and the gas temperature is then calculated in Step S13. After that, it is determined in Step S14 whether or not the temperature difference calculated in Step S13 is larger than zero and the gas temperature is higher than the dew-point temperature of residual gas at that time. Meanwhile, the dew-point temperature can be calculated using saturated vapor pressure curve-data, which is prepared in advance, on the basis of measured values of a gas temperature and humidity in the intercooler 60.

When the temperature difference between the IC coolant temperature and the gas temperature is zero or less or when the gas temperature falls to the dew-point temperature, the drive of the pump 64 is stopped in Step S18. The reason why the drive of the pump 64 is stopped in a case in which the temperature difference is zero or less is that the gas temperature falls while following the coolant temperature that is lower than the gas temperature in a case in which IC coolant is circulated. Since the supply of IC coolant to the intercooler 60 is stopped, the fall of the gas temperature and the generation of condensed water caused by the fall of the gas temperature are suppressed. The reason why the drive of the pump 64 is stopped in a case in which the gas temperature falls to the dew-point temperature is to prevent energy required for driving the pump 64 from being wasted.

When the temperature difference between the IC coolant temperature and the gas temperature is larger than zero and the gas temperature is higher than the dew-point temperature of residual gas at that time, the drive of the pump 64 is performed in Step S15. Then, the valve opening of the flow regulating valve is regulated in the Step S16 according to the temperature difference between the IC coolant temperature and the gas temperature. Specifically, the valve opening of the flow regulating valve is regulated so that the flow rate of coolant supplied to the intercooler 60 is increased as the temperature difference is reduced. Since the flow rate of IC coolant is regulated according to the temperature difference, the waste of energy required for the supply of IC coolant can be suppressed while the generation of condensed water is reliably suppressed. Meanwhile, when the temperature difference is zero or less, that is, the IC coolant temperature is equal to or lower than the gas temperature, the flow regulating valve is also closed together with the stop of the drive of the pump 64.

Next, it is determined again in Step S17 whether or not the temperature difference is larger than zero and the gas temperature is higher than the dew-point temperature of residual gas at that time. When the temperature difference is larger than zero and the gas temperature is higher than the dew-point temperature of residual gas at that time, the regulation of the valve opening according to the temperature difference is continuously performed in Step S16. When the temperature difference is zero or less or when the gas temperature falls to the dew-point temperature, the drive of the pump 64 is stopped in Step S18 and the control flow ends.

Figure 11:
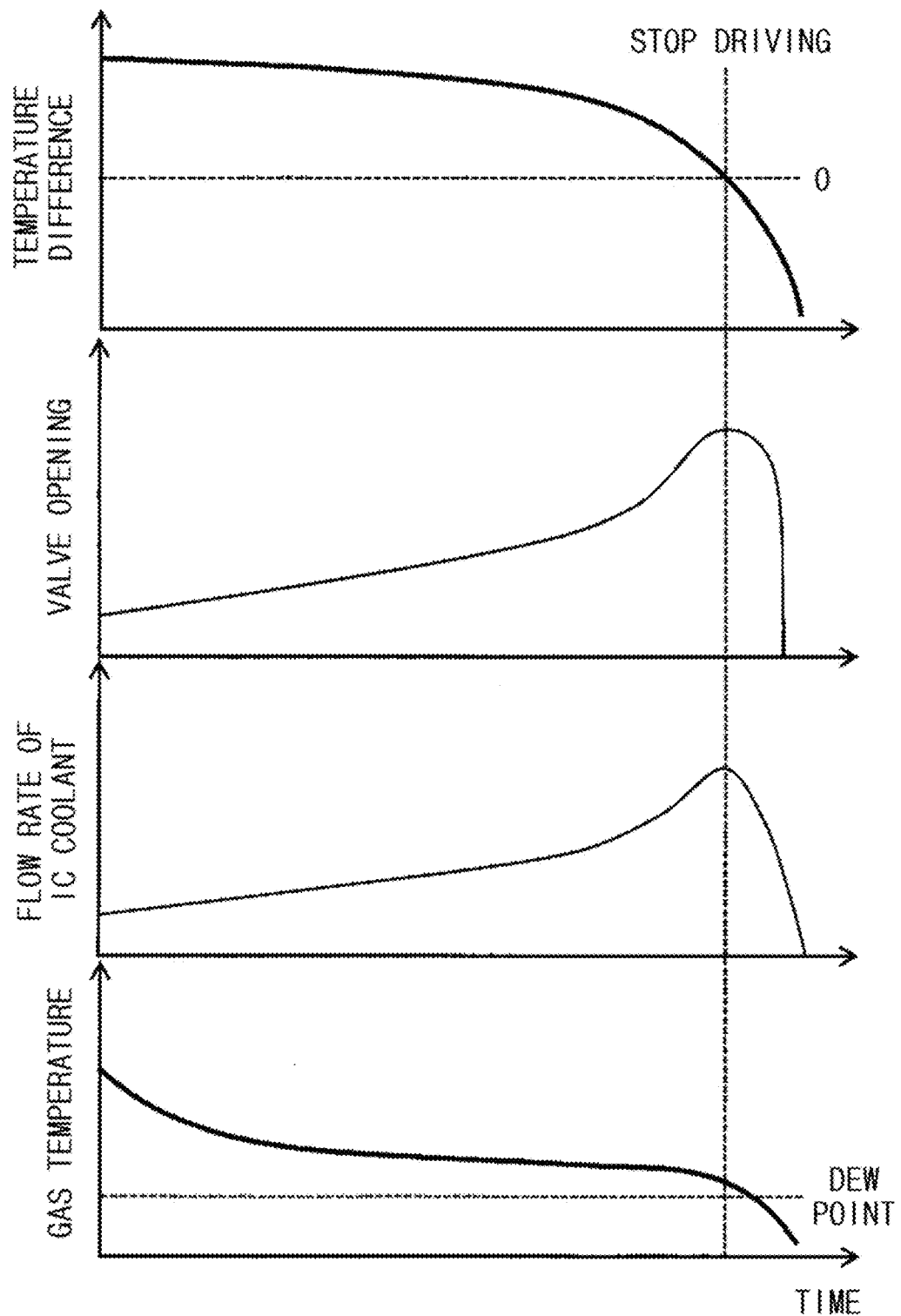
FIG. 11 is a diagram illustrating examples of control results of the condensed water-suppression control according to the third embodiment of the disclosure.

FIG. 11 is a diagram illustrating examples of results of the above-described condensed water-suppression control. The changes with time in a temperature difference between an IC coolant temperature and a gas temperature, the valve opening of the flow regulating valve, the flow rate of IC coolant, and the gas temperature are illustrated in FIG. 11 in this order from the upper stage. In the examples illustrated in FIG. 11, the temperature difference becomes zero before the gas temperature becomes equal to or lower than the dew-point temperature, and the drive of the pump 64 is stopped at that point of time. Until the drive of the pump 64 is stopped, the valve opening is increased according to a reduction in the temperature difference and the flow rate of IC coolant is increased. Since the flow rate of IC coolant is regulated according to the temperature difference as described above, the fall of the gas temperature is suppressed. Accordingly, the time required until the gas temperature falls to a temperature equal to or lower than the dew-point temperature, can be lengthened.

4. Fourth Embodiment

4-1. Configuration of Hybrid System of Hybrid Vehicle

Figure 12:
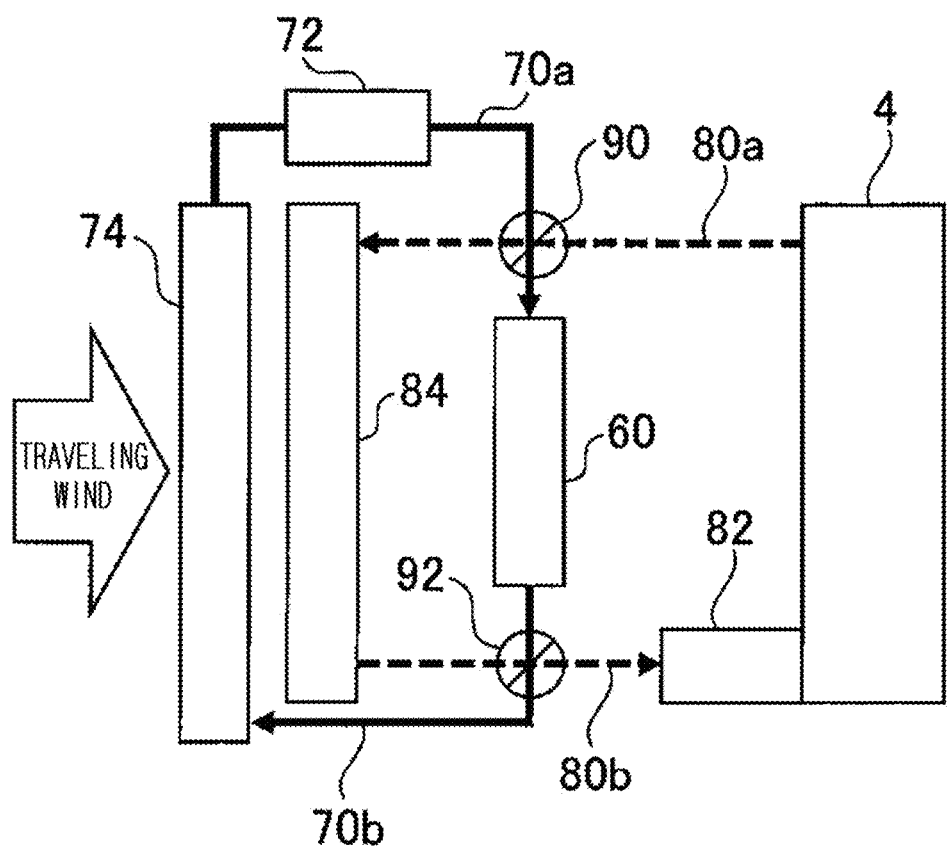
FIG. 12 is a diagram illustrating the configuration of a cooling system for an engine and an intercooler and the flow of coolant during a normal operation according to the fourth embodiment of the disclosure.

The configuration of a hybrid system of a hybrid vehicle according to this embodiment is basically the same as that of the hybrid system of the hybrid vehicle according to the first embodiment illustrated in FIG. 1. However, as a cooling system for the engine 4 and the intercooler 60, the configuration illustrated in FIG. 12 is applied. FIG. 12 is a diagram illustrating the configuration of a cooling system for the engine 4 and the intercooler 60 according to this embodiment.

Two radiators 74 and 84 are arranged in the direction of traveling wind on the front side of the engine 4 in a direction against traveling wind. Since coolant of which the temperature is relatively low flows in the radiator 74 positioned on the front side, the radiator 74 is referred to as a low-water temperature radiator hereinafter. Since coolant of which the temperature is relatively high flows in the radiator 84 positioned on the rear side, the radiator 84 is referred to as a high-water temperature radiator hereinafter. During a normal operation where the engine 4 is operated, the low-water temperature radiator 74 and the intercooler 60 are connected to each other via coolant-flow passages 70a and 70b and coolant is circulated between the low-water temperature radiator 74 and the intercooler 60 by a pump 72. Further, the high-water temperature radiator 84 and the engine 4 are connected to each other via coolant-flow passages 80a and 80b and coolant is circulated between the high-water temperature radiator 84 and the engine 4 by a pump 82. Meanwhile, the pumps 72 and 82 are, for example, electric pumps that are driven independently of each other.

Figure 13:
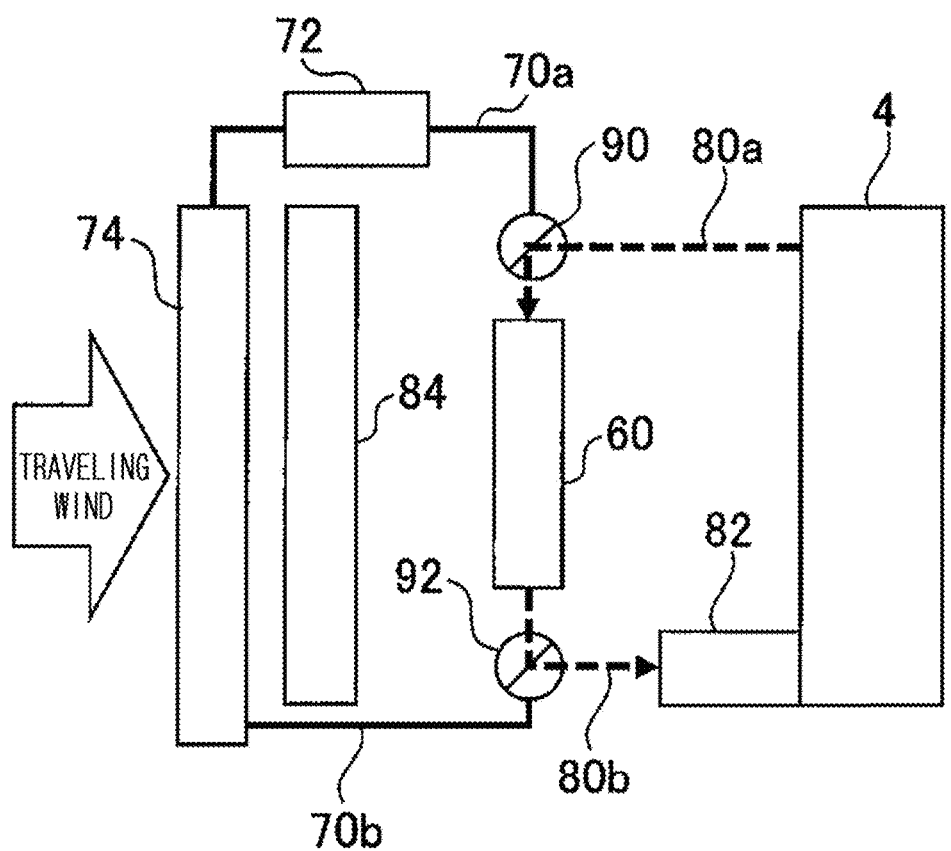
FIG. 13 is a diagram illustrating the configuration of the cooling system for the engine and the intercooler and the flow of coolant in a state in which the engine is stopped according to the fourth embodiment of the disclosure.

The coolant-flow passages 70a and 80a partially overlap with each other, and a water path-switching valve 90 is provided at a portion where the coolant-flow passages 70a and 80a overlap with each other. Further, the coolant-flow passages 70b and 80b partially overlap with each other, and a water path-switching valve 92 is provided at a portion where the coolant-flow passages 70b and 80b overlap with each other. The water path-switching valves 90 and 92 are operated in conjunction with each other by an operation signal output from the control device 100, and can switch the path of coolant between the path of coolant illustrated in FIG. 12 and the path of coolant illustrated in FIG. 13. When the path of coolant illustrated in FIG. 12 is selected, a coolant circuit (first coolant circuit) in which coolant is circulated between the low-water temperature radiator 74 and the intercooler 60 by the drive of the pump 72 is formed. When the path of coolant illustrated in FIG. 13 is selected, a coolant circuit (second coolant circuit) in which coolant is circulated between the engine 4 and the intercooler 60 by the drive of the pump 82 is formed.

4-2. Characteristic Functions of Control Device of Hybrid Vehicle

4-2-1. Outline of Condensed Water-Suppression Control

According to the hybrid system having the above-described configuration, coolant supplied to the intercooler 60 can be switched between the two types of coolant by the operation of the water path-switching valves 90 and 92. One of the two types of coolant is coolant that is cooled by the low-water temperature radiator 74, and the other is coolant that has passed through the engine 4. The coolant that has passed through the engine 4 absorbs the heat of the engine 4, so that the temperature of the coolant becomes higher than a gas temperature in the intercooler 60. Accordingly, in the condensed water-suppression control of this embodiment, high-temperature coolant that has passed through the engine 4 is supplied to the intercooler 60 while the vehicle is traveling in a state in which the engine 4 is stopped. As a result, the fall of the gas temperature in the intercooler 60 is suppressed.

4-2-2. Detail of Condensed Water-Suppression Control

The control device 100 selects the path of coolant illustrated in FIG. 12 during the normal operation where the engine 4 is operated. By this selection, the low-temperature coolant that is cooled by the low-water temperature radiator 74 is supplied to the intercooler 60, and the gas passing through the intercooler 60 is cooled, so that the charging efficiency of the engine 4 is increased. On the other hand, while the vehicle is traveling in a state in which the engine 4 is stopped, the control device 100 selects the path of coolant illustrated in FIG. 13 as the condensed water-suppression control. By this selection, the high-temperature coolant that is heated by the heat of the engine 4 is supplied to the intercooler 60 and the fall of the gas temperature in the intercooler 60 is suppressed by the supply of heat from the high-temperature coolant. Accordingly, the generation of condensed water in the intercooler 60 is suppressed.

FIG. 14 is a flowchart illustrating the control flow of the above-mentioned condensed water-suppression control. According to the flowchart illustrated in FIG. 14, first, it is determined in Step S21 whether or not the engine 4 is stopped. When the engine 4 is not stopped, this control flow ends.

When the engine 4 is stopped, it is then determined in Step S22 whether or not a vehicle is traveling. When the vehicle is not traveling, that is, the vehicle is stopped, this control flow ends.

When the vehicle is traveling, in Step S23, the water path-switching valves 90 and 92 are then switched to a heated water side, that is, a side where high-temperature coolant having passed through the engine 4 is supplied to the intercooler 60. Accordingly, the generation of condensed water in the intercooler 60 is suppressed.

Next, it is determined again in Step S24 whether or not the engine 4 is stopped. When the engine 4 is stopped, the water path-switching valves 90 and 92 are maintained on the heated water side in Step S23. When the engine 4 is restarted, in Step S25, the water path-switching valves 90 and 92 are then switched to a cooled water side, that is, a side where low-temperature coolant cooled by the low-water temperature radiator 74 is supplied to the intercooler 60. After that, this control flow ends. Here, a timing where the water path-switching valves 90 and 92 are to be switched to the cooled water side may be after a certain time elapsed after switching the water path-switching valves 90 and 92 to the heated water side, or after coolant flowing in the intercooler 60 has been sufficiently heated.

5. Other Embodiments

In the above-mentioned embodiments, the engine includes the supercharger that is provided on the intake passage upstream of the intercooler, but the supercharger is not essential in the present disclosure. However, since condensed water is likely to be generated in the intercooler in a case in which the engine includes the supercharger, an effect obtained by applying the present disclosure becomes more remarkable. Meanwhile, the supercharger in this case includes not only a turbo-supercharger but also a mechanical supercharger or an electric supercharger.

In the above-mentioned embodiments, the intercooler is provided on the intake passage downstream of the throttle valve, but may be provided on the intake passage upstream of the throttle valve. Further, when the engine includes a plurality of banks, an intercooler may be provided for each bank.

In the above-mentioned embodiments, The EGR device is configured as an LPL-EGR device, but can also be configured as a HPL-EGR device. In this case, the intercooler is disposed on the downstream side of an EGR gas-introduction portion of the intake passage into which EGR gas is to be introduced.

What is claimed is:

1. A hybrid vehicle comprising:
an engine including an EGR device;
a motor; and
a control device,
wherein the engine includes a water-cooled heat exchanger that performs heat exchange with gas flowing in an intake passage on a downstream side of an EGR gas-introduction portion of the intake passage into which EGR gas is introduced, and
wherein the control device is programmed to execute a condensed water-suppression control that supplies coolant having a temperature higher than the temperature of the gas heat-exchanged in the water-cooled heat exchanger to the water-cooled heat exchanger while the hybrid vehicle is traveling in a state in which the engine is stopped.

2. The hybrid vehicle according to claim 1, wherein the control device is configured to acquire a coolant temperature that is the temperature of the coolant used for heat exchange in the water-cooled heat exchanger and a gas temperature that is the temperature of the gas heat-exchanged in the water-cooled heat exchanger during the execution of the condensed water-suppression control, to perform the supply of the coolant to the water-cooled heat exchanger only in a case in which the coolant temperature is higher than the gas temperature, and to pause the supply of the coolant to the water-cooled heat exchanger in a case in which the coolant temperature is equal to or lower than the gas temperature.

3. The hybrid vehicle according to claim 2, wherein the control device is configured to measure the temperature of the coolant used for heat exchange in the water-cooled heat exchanger by a temperature sensor, to correct a measured value obtained by the temperature sensor according to a vehicle speed of the hybrid vehicle or a physical quantity correlated with the vehicle speed, and to acquire the measured value that is corrected to a lower value as the vehicle speed is higher as the coolant temperature.

4. The hybrid vehicle according to claim 2, wherein the control device is configured to estimate the temperature of the coolant that is used for heat exchange in the water-cooled heat exchanger using a model that uses at least a heat generation amount of the engine, an outdoor air temperature, and a vehicle speed of the hybrid vehicle or a physical quantity correlated with the vehicle speed as parameters, and to acquire an estimated value that is estimated using the model as the coolant temperature.

5. The hybrid vehicle according to claim 3, wherein the physical quantity is an output of the motor.

6. The hybrid vehicle according to claim 2, wherein the control device is configured to increase a flow rate of the coolant supplied to the water-cooled heat exchanger as a temperature difference between the coolant temperature and the gas temperature is reduced.

7. The hybrid vehicle according to claim 2, wherein the control device is configured to pause the supply of the coolant to the water-cooled heat exchanger when the gas temperature falls to a dew-point temperature.

8. The hybrid vehicle according to claim 1, wherein the water-cooled heat exchanger is configured to be selectively connected to any one of a first coolant circuit where the engine is not included in a flow passage for the coolant and a second coolant circuit where the engine is included in the flow passage for the coolant, and
wherein the control device is configured to connect the water-cooled heat exchanger to the first coolant circuit during an operation of the engine and to connect the water-cooled heat exchanger to the second coolant circuit during the execution of the condensed water-suppression control.

* * * * *